(12) United States Patent
Jarvinen et al.

(10) Patent No.: US 11,163,916 B2
(45) Date of Patent: Nov. 2, 2021

(54) AUTOMATIC GENERATION OF DIMENSION AND TOLERANCE INFORMATION FOR FASTENED COMPONENTS

(71) Applicant: Dassault Systemes SolidWorks Corporation, Waltham, MA (US)

(72) Inventors: Todd Jarvinen, Cameron Park, CA (US); Clay Tornquist, East Greenwich, RI (US); Matthew Lorono, Broomfield, CO (US)

(73) Assignee: DASSAULT SYSTEMES SOLIDWORKS CORPORATION, Waltham, MA (US)

( * ) Notice: Subject to any disclaimer, the term of this patent is extended or adjusted under 35 U.S.C. 154(b) by 399 days.

(21) Appl. No.: 15/810,792

(22) Filed: Nov. 13, 2017

(65) Prior Publication Data

US 2018/0365344 A1    Dec. 20, 2018

Related U.S. Application Data

(60) Provisional application No. 62/520,734, filed on Jun. 16, 2017.

(51) Int. Cl.
*G06F 30/00* (2020.01)
*G06T 19/00* (2011.01)
(Continued)

(52) U.S. Cl.
CPC .............. *G06F 30/00* (2020.01); *G06T 19/00* (2013.01); *G06F 2111/20* (2020.01);
(Continued)

(58) Field of Classification Search
CPC .. G06F 30/00; G06F 2119/18; G06F 2111/20; G06T 19/00; G06T 7/60; G06T 2210/12; G06T 2219/012
See application file for complete search history.

(56) References Cited

U.S. PATENT DOCUMENTS 6,963,824 B1 * 11/2005 Davidson ................ G06F 30/00
703/2
7,477,262 B2    1/2009 Tornquist et al.
(Continued)

OTHER PUBLICATIONS

Zhenbo, Gao & Jing, Wang & Yanlong, Cao & Jiangxin, Yang. (2016). Automatic Generation of 3D Assembly Dimension Chain Based on Feature Model. Procedia CIRP. 43. 70-75. 10.1016/j.procir. Feb. 12, 2016.*

*Primary Examiner* — Kamini S Shah
*Assistant Examiner* — Peter Pham
(74) *Attorney, Agent, or Firm* — Hamilton, Brook, Smith & Reynolds, P.C.

(57) ABSTRACT

A common task when designing computer-aided design (CAD) assemblies is to ensure that the tolerances applied to each component are such that the assembly will function as expected when the parts are made to the extremes of their tolerance zones. The disclosed methods and systems automatically generate dimension and tolerance information for fastened components. Given a source component with dimensions and tolerances, the dimensions and tolerances are automatically applied to mating entities of a target component such that fit is insured without interference when the parts are manufactured at worst case, or at the extremes of their tolerance zones.

20 Claims, 6 Drawing Sheets

(51) Int. Cl.
*G06T 7/60* (2017.01)
*G06F 111/20* (2020.01)
*G06F 119/18* (2020.01)

(52) U.S. Cl.
CPC ............ *G06F 2119/18* (2020.01); *G06T 7/60* (2013.01); *G06T 2210/12* (2013.01); *G06T 2219/012* (2013.01)

(56) References Cited

U.S. PATENT DOCUMENTS

| | | | |
|---|---|---|---|
| 7,590,497 B2 | 9/2009 | Tornquist et al. | |
| 2005/0288889 A1* | 12/2005 | Wilson | G06T 7/0006 702/155 |
| 2006/0052977 A1* | 3/2006 | Wilson | G06T 7/75 702/155 |
| 2006/0106476 A1* | 5/2006 | Tornquist | G05B 19/4097 700/98 |
| 2010/0087942 A1* | 4/2010 | Sims, Jr. | G06F 30/00 700/103 |
| 2010/0114519 A1* | 5/2010 | Hollingshead | G01B 21/16 702/113 |
| 2014/0288887 A1* | 9/2014 | Ooishi | G06F 30/17 703/1 |
| 2014/0379309 A1* | 12/2014 | Banta | G06F 30/23 703/1 |
| 2016/0189433 A1* | 6/2016 | Dayde | G06F 3/04842 345/419 |
| 2016/0327937 A1* | 11/2016 | Erion | G05B 19/4097 |
| 2018/0349546 A1* | 12/2018 | Bhave | G06T 17/10 |

* cited by examiner

AUTOMATIC GENERATION OF DIMENSION AND TOLERANCE INFORMATION FOR FASTENED COMPONENTS

RELATED APPLICATION

This application claims the benefit of U.S. Provisional Application No. 62/520,734, filed on Jun. 16, 2017. The entire teachings of the above application are incorporated herein by reference.

BACKGROUND

Computer-aided design (CAD) software allows a user to construct and manipulate complex three-dimensional (3D) models. A number of different modeling techniques can be used to create a 3D model. One such technique is a solid modeling technique, which provides for topological 3D models where the 3D model is a collection of interconnected topological entities (e.g., vertices, edges, and faces). The topological entities have corresponding supporting geometrical entities (e.g., points, trimmed curves, and trimmed surfaces). The trimmed surfaces correspond to the topological faces bounded by the edges. CAD systems may combine solid modeling and other modeling techniques, such as parametric modeling techniques. Parametric modeling techniques can be used to define various parameters for different features and components of a model, and to define relationships between those features and components based on relationships between the various parameters.

A design engineer is a typical user of a 3D CAD system. The design engineer designs physical and aesthetic aspects of 3D models, and is skilled in 3D modeling techniques. The design engineer creates parts and may assemble the parts into a subassembly. A subassembly may also consist of other subassemblies. An assembly is designed using parts and subassemblies. Parts and subassemblies are hereinafter collectively referred to as components.

The following are definitions of certain terms that can be used when describing a 3D CAD system.

Assembly: A document in which parts, features, and other assemblies (subassemblies) are mated together. Parts and subassemblies can exist in documents separate from the assembly. For example, in an assembly, a piston can be mated to other parts, such as a connecting rod or cylinder. This assembly can then be used as a subassembly in an assembly of an engine.

Annotation: Text or a symbol that adds dimensional information to an entity of an assembly.

Body: A solid body includes topological data and geometric data. The topological data (e.g., faces, edges, and vertices) in a solid body have corresponding geometric data in the same solid body. Each vertex corresponds to a point. Each edge corresponds to a curve. Each face corresponds to a surface. An example multibody part for a wheel can include an axle body, rim body, and a number of spoke bodies to connect the axle and rim bodies.

Bounding Box: The smallest box in which an entity fits.

Component: Any part or subassembly within an assembly.

Datum: Measurement information regarding an entity (e.g., a point, axis, line, plane, or combination thereof). Datums can be used in conjunction with geometric tolerances to indicate how a manufactured part should be inspected.

Edge: A single outside boundary of a feature.

Entity: A discrete element, such a face, edge, vertex, etc.

Face: A selectable area (planar or otherwise) of a model or surface with boundaries that help define the shape of the model or surface. For example, a rectangular solid has six faces, and a cylindrical solid has three faces.

Feature: An individual shape that, combined with other features, makes up a part or assembly.

Large Design Review: A mode of assembly review that allows a very large assembly to open quickly, while still retaining capabilities that are useful when conducting design reviews of assemblies. In large design review mode, a use can: Navigate a design tree of the assembly, measure distances, create cross sections, hide and show components, and create, edit, and play back walk-throughs. Large design review mode can also be referred to as "Graphics Mode."

Lightweight: A part in an assembly that has only a subset of its model data loaded into memory. The remaining model data is loaded on an as-needed basis. Lightweight improves performance of large and complex assemblies.

Mate: A geometric relationship between entities (e.g., parts or bodies) in an assembly. Example mates include angle, coincident, concentric, distance, parallel, perpendicular, and tangent.

Part: A single 3D object made up of features. A part can include multiple bodies. A part can become a component in an assembly. Examples of parts include, for example, a bolt, pin, and plate.

Plane: A flat construction geometry.

Point: A singular location in a 3D model.

Resolved: A state of an assembly component in which it is fully loaded in memory. When resolved, all of the component's model data is available, so its entities can be selected, referenced, edited, used in mates, etc.

Subassembly: An assembly that is part of a larger assembly. For example, a steering mechanism of a car is a subassembly of the car.

Surface: A zero-thickness planar or 3D entity with edge boundaries.

Vertex: A point at which two or more edges intersect. Vertices can be selected for sketching, dimensioning, and many other CAD operations.

A solid modeling system may be a feature-based 3D CAD system wherein a part is constructed using various features. Examples of features include bosses, fillets, chamfers, cuts, holes, shells, lofts, and sweeps. CAD systems store the contents of parts, subassemblies, and assemblies in a data file. In addition to features, the contents of CAD data files may include design profiles, layouts, internal components (e.g., bodies), and graphical entities.

A common task when designing CAD assemblies is to ensure that the tolerances applied to each component are such that the assembly will function as expected when the parts are made to the extremes of their tolerance zones. A common example of this involves parts which are mated with fasteners, which can fall into two basic categories: "fixed" and "floating" fastener assemblies.

SUMMARY

The disclosed methods and systems automatically generate dimension and tolerance information for fastened components. Given a source component with tolerances, the dimensions and tolerances are automatically applied to mating components such that fit is ensured without interference when the parts are manufactured at worst case or at the extremes of their tolerance zones.

One example embodiment is a computer-implemented method of automatically generating dimension and tolerance information for a target component, given a source component, in a subject computer-aided design (CAD) model of a real-world object. According to the method, a source feature of the source component to be mated with the target component is determined. A mating feature on the target component is determined by searching for existing datums of the target component, or by determining comparable or mating features on the target component based on geometric properties of faces of the target component. A tolerance for the mating feature is determined by determining comparable or mating features on the target component based on a tolerance of the source feature and geometric properties of faces of the target component. The method continues by computing a virtual size of the source feature based on a maximum material size of the source feature and a position tolerance of the source feature, computing an available tolerance for the target component based on a size of the target component and the virtual size of the source feature, computing a position tolerance for the target component based on the available tolerance for the target component, and computing a size tolerance for the target component based on the available tolerance and the position tolerance for the target component. The position tolerance and size tolerance are then applied to the target component.

Another example embodiment is a CAD system including a computer database and a processor operatively coupled to the computer database. The computer database stores information regarding source and target components of a CAD model representing a real-world object. The processor determines a source feature from the source component to be mated with the target component, and determines a mating feature on the target component by searching for existing datums of the target component, or by determining comparable or mating features on the target component based on geometric properties of faces of the target component. The processor then determines a tolerance for the mating feature by determining comparable or mating features on the target component based on a tolerance of the source feature and geometric properties of faces of the target component. The processor computes a virtual size of the source feature based on a maximum material size of the source feature and a position tolerance of the source feature, computes an available tolerance for the target component based on a size of the target component and the virtual size of the source feature, computes a position tolerance for the target component based on the available tolerance for the target component, and computes a size tolerance for the target component based on the available tolerance and the position tolerance for the target component. The processor applies the position tolerance and size tolerance to the target component in the computer database.

Another example embodiment is a computer-readable data storage medium having computer-readable program codes embodied therein for automatically generating dimension and tolerance information for a target component, given a source component, in a subject CAD model of a real-world object. The computer-readable data storage medium program codes including instructions that, when executed by a processor, cause the processor to determine a source feature from the source component to be mated with the target component, and determine a mating feature on the target component by searching for existing datums of the target component, or by determining comparable or mating features on the target component based on geometric properties of faces of the target component. The instructions further cause the processor to determine a tolerance for the mating feature by determining comparable or mating features on the target component based on a tolerance of the source feature and geometric properties of faces of the target component. The instructions further cause the processor to compute a virtual size of the source feature based on a maximum material size of the source feature and a position tolerance of the source feature, compute an available tolerance for the target component based on a size of the target component and the virtual size of the source feature, compute a position tolerance for the target component based on the available tolerance for the target component, and compute a size tolerance for the target component based on the available tolerance and the position tolerance for the target component. The instructions further cause the processor to apply the position tolerance and size tolerance to the target component in the computer database.

In some embodiments, determining a source feature from the source component to be paired with the target component can include determining, for example, a feature for a hole, a feature to mate a hole and a pin, or a feature for an orientation tolerance. In some embodiments, an order, from among a plurality of source features, in which the source feature is to be mated with the target component can be determined.

In some embodiments, determining comparable or mating features on the target component based on geometric properties of faces of the target component can include: (i) comparing a bounding box for the source component feature with a bounding box for the target component to determine whether the bounding box for the source component feature is within the bounding box for the target component, (ii) comparing the bounding box for the source component feature with a bounding box for each body of the target component to determine whether the bounding box for the source component feature is within the bounding box for a body of the target component, (iii) comparing the bounding box for the source component feature with a bounding box for each face of each body of the target component to determine whether the bounding box for the source component feature is within the bounding box for a face of a body of the target component, (iv) for each face of each body of the target component that is determined to be within the bounding box for the source component feature, determining a candidate feature, and (v) comparing the source component feature with the candidate feature based on geometric characteristics to determine whether a comparable or mating feature is found in the target component.

Another example embodiment is a method of determining, for a source component feature of a CAD model, comparable or mating features on a target component of the CAD model. According to the method, a bounding box for the source component feature is compared with a bounding box for the target component to determine whether the bounding box for the source component feature is within the bounding box for the target component. The method continues by comparing the bounding box for the source component feature with a bounding box for each body of the target component to determine whether the bounding box for the source component feature is within the bounding box for a body of the target component. The method continues by comparing the bounding box for the source component feature with a bounding box for each face of each body of the target component to determine whether the bounding box for the source component feature is within the bounding box for a face of a body of the target component. For each face of each body of the target component that is determined to be within the bounding box for the source component feature, a candidate feature is determined and compared with the source component feature based on geometric characteristics to determine whether a comparable or mating feature is found in the target component. In some embodiments, the bounding box for the source component is determined by creating a bounding box for each face of the source feature and combining the bounding boxes together to create one bounding box for the source feature.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Figure 1:
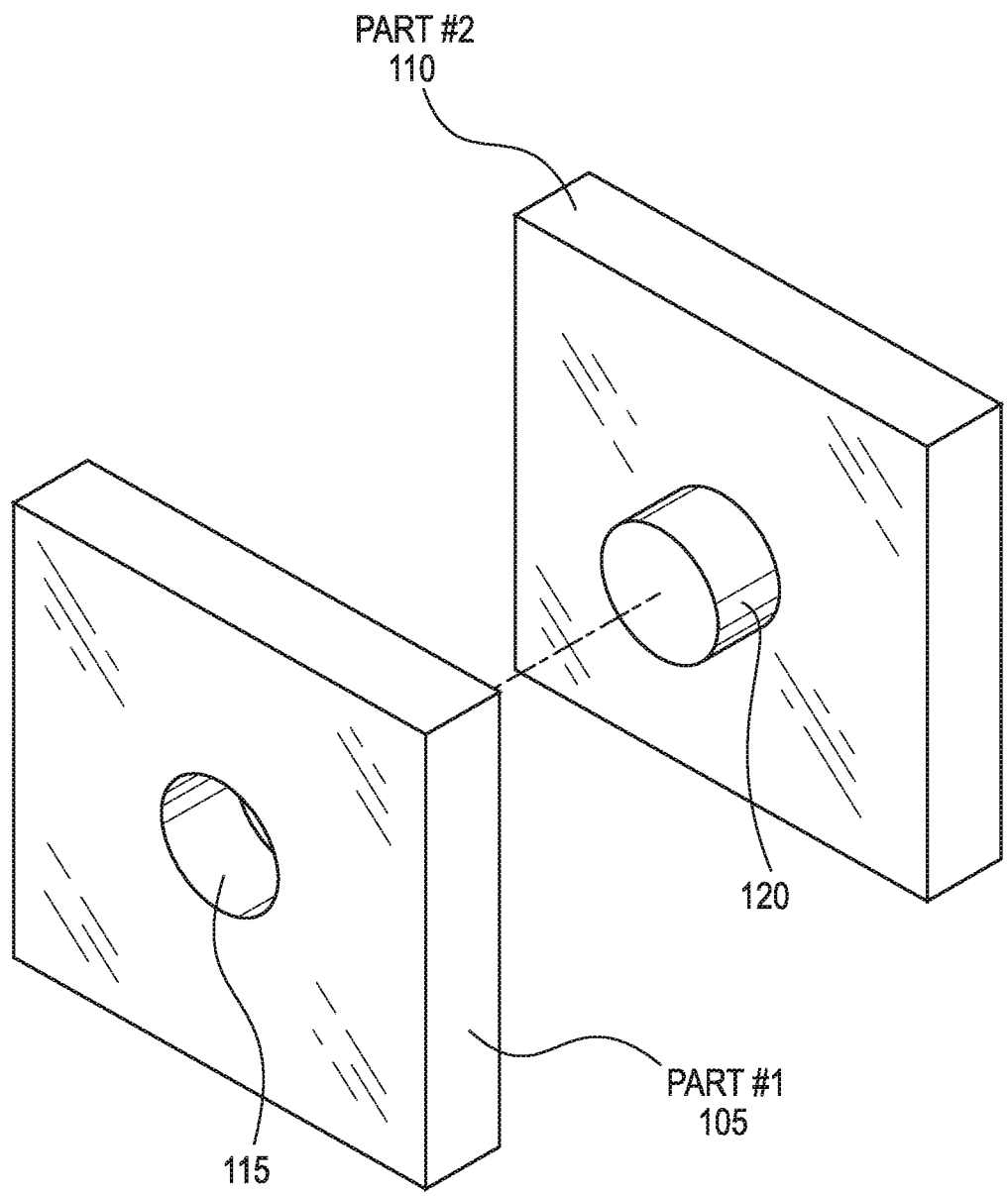
FIG. 1 is an illustration of a computer-generated model having two parts.
Figure 2:
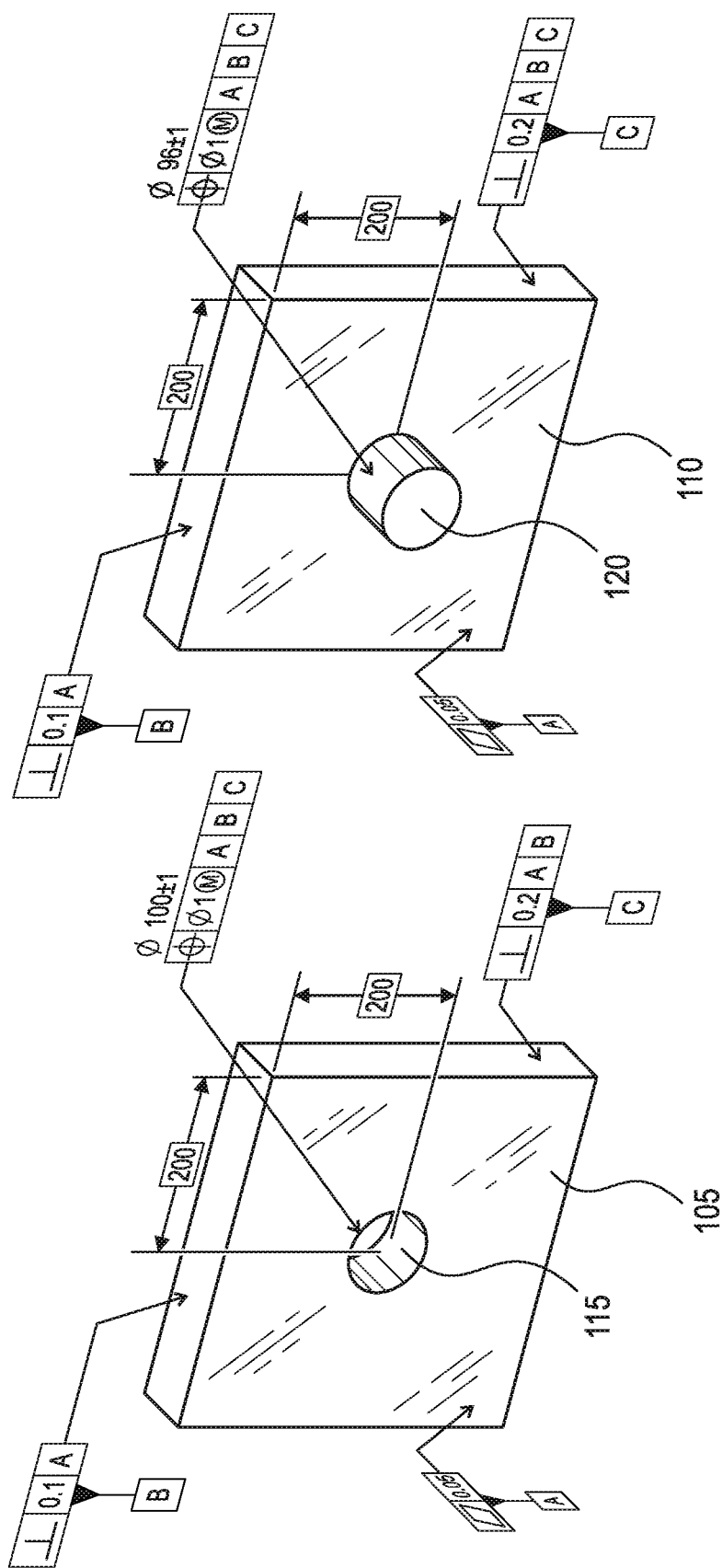
FIG. 2 is an illustration of an example geometric tolerancing scheme applied to the parts of the computer-generated model of FIG. 1.
Figure 3:
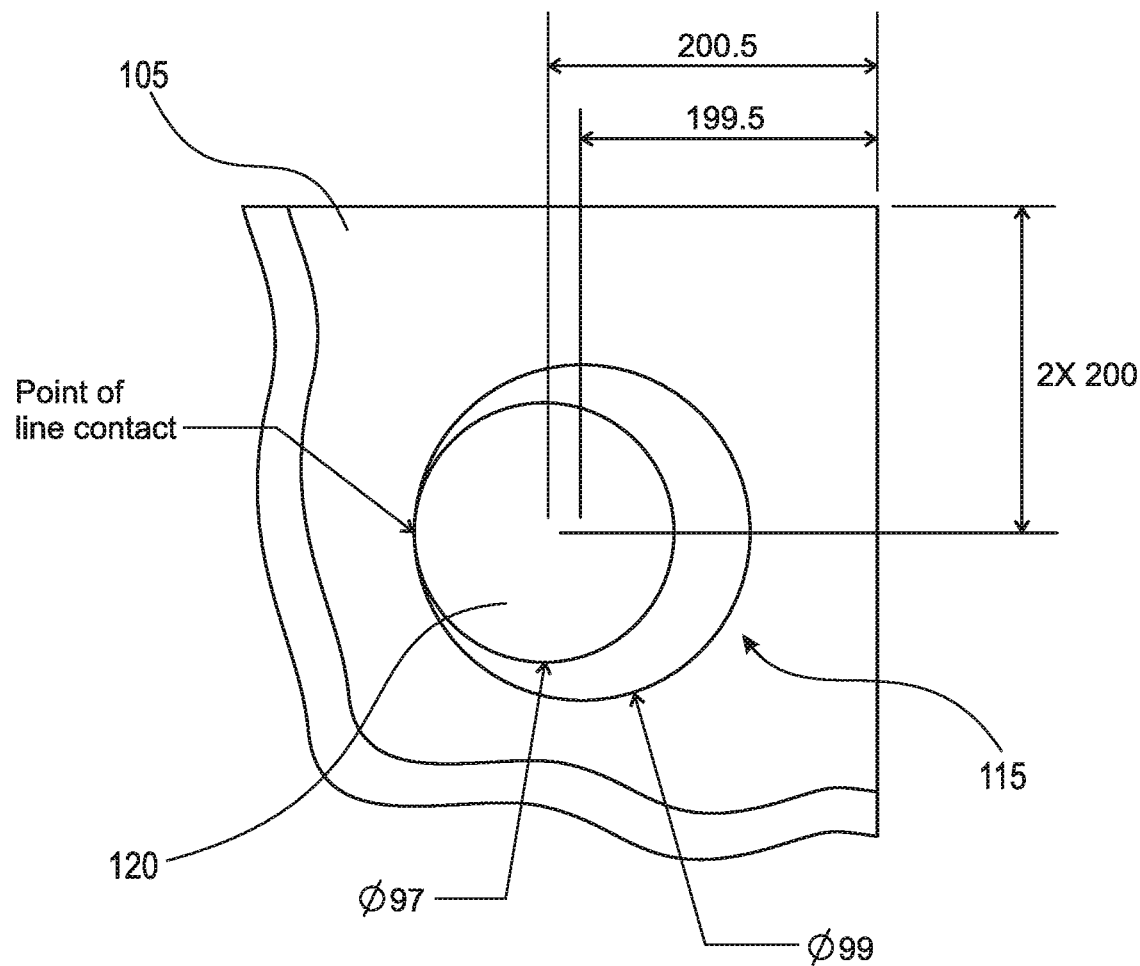
FIG. 3 is an illustration of an example worst case line fit condition between the hole and the shaft of the parts of the computer-generated model of FIG. 1.

FIGS. 1-3 illustrate a fixed fastener assembly including two parts 105 and 110, shown separated in FIG. 1. Part 105 includes a hole 115, and part 110 includes a shaft 120. Parts 105 and 110 can be constrained with the following example requirements: (1) the shaft 120 must fit into the hole 115, (2) the parts 105 and 110 must seat on one another with a minimum of three high points of contact, and (3) the top and right hand edges of both parts 105 and 110 (from which the dimensions originate to locate the hole 115 and the shaft 120) must align. Given the assembly requirements, an example geometric tolerancing scheme to locate the hole 115 and shaft 120 is shown in FIG. 2. FIG. 3 shows one possible condition where a worst case line fit condition exists between the hole 115 and the shaft 120 when the features are at their maximum material condition (MMC) size, and are located at the extents of their respective tolerance zones.

Figure 4:
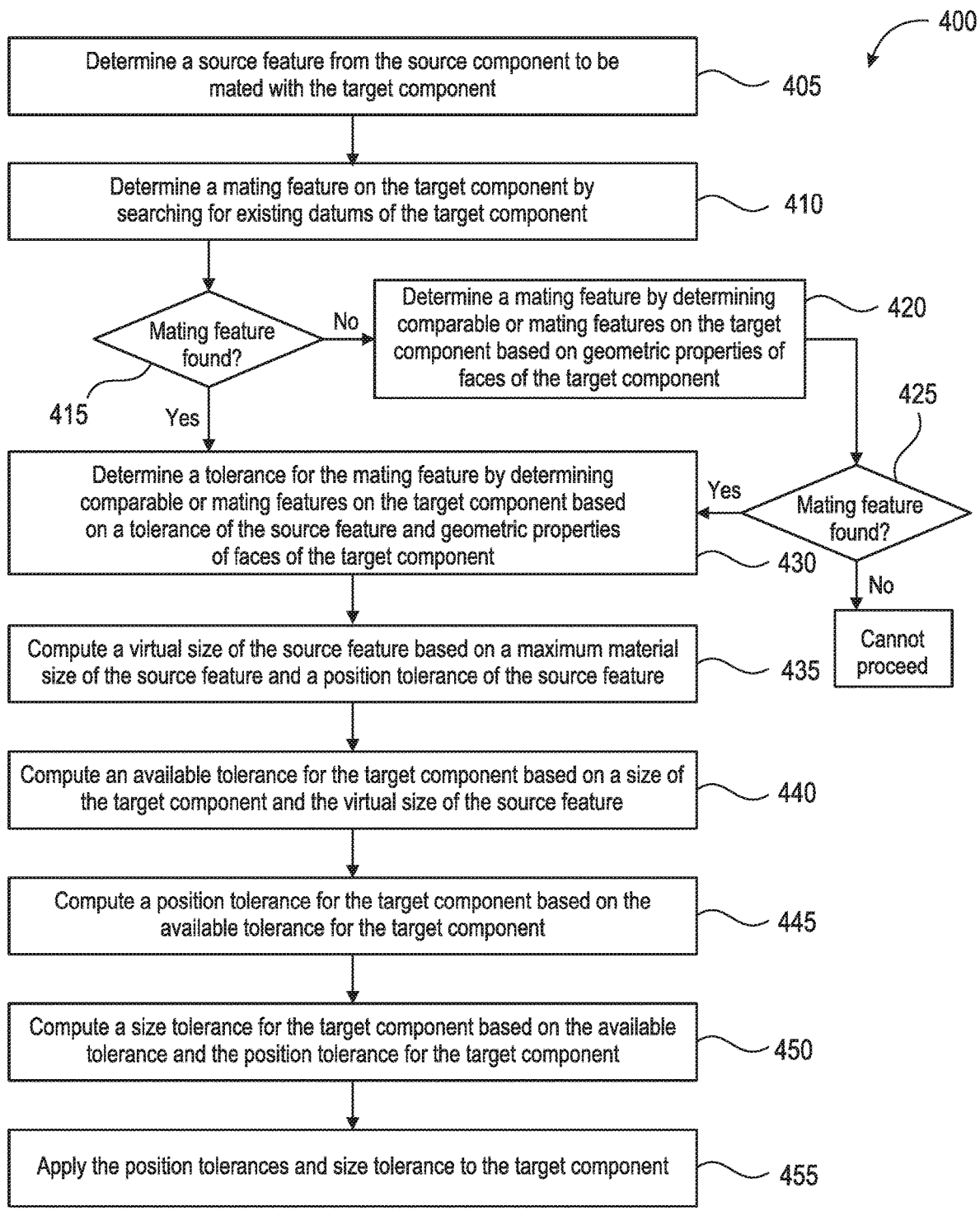
FIG. 4 is a flow diagram illustrating automatically generating dimension and tolerance information for a target component, given a source component, in a subject CAD model, according to an example embodiment.

FIG. 4 is a flow diagram illustrating a method 400 of automatically generating dimension and tolerance information for a target component, given a source component, in a subject CAD model, according to an example embodiment. According to the example method 400, a source feature of the source component to be mated with the target component is determined 405. A mating feature on the target component is determined 410 by searching for existing datums of the target component (e.g., if a candidate mating feature on the target is associated with an existing feature, it is compared to the source feature). If a mating feature on the target component is not determined 415 by searching for existing datums, a mating feature is determined 420 by determining comparable or mating features on the target component based on geometric properties of faces of the target component. If a mating feature is found 425, tolerance for the mating feature is determined 430 by determining comparable or mating features on the target component based on a tolerance of the source feature and geometric properties of faces of the target component. The method 400 continues by computing 435 a virtual size of the source feature based on a maximum material size of the source feature and a position tolerance of the source feature (e.g., maximum material size of the source feature plus or minus the position tolerance), computing 440 an available tolerance for the target component based on a size of the target component and the virtual size of the source feature (e.g., difference between the size of the target feature and the virtual size of the source feature), computing 445 a position tolerance for the target component based on the available tolerance for the target component, and computing 450 a size tolerance for the target component based on the available tolerance and the position tolerance for the target component (e.g., difference between the available tolerance for the target component and the position tolerance for the target component). The position tolerance and size tolerance are then applied 455 to the target component.

The following describes in detail an example process for automatically generating dimension and tolerance information for fastened components (e.g., components such as those illustrated in FIGS. 1-3) as implemented using a SOLIDWORKS® CAD system available from Dassault Systemes SolidWorks Corporation in Waltham, Mass.

Select source and target components—The process may start with a user (e.g., CAD designer) selecting source and target components. The source component is expected to have the necessary datums, and geometric position and size tolerances applied to the mating features and hole patterns. The target component can be void of any dimensions and tolerances, but existing dimensions and tolerances can be used if present.

Find candidate annotation from the source—The automated process finds the candidate annotation on the source to be paired with the target by, for example, extracting position tolerances from the source's annotation collection, which can include all Geometric Dimension and Tolerancing (GD&T) types and dimension tolerances. As described above, an annotation includes text or symbol(s) that add dimensional information to an entity of an assembly. One or more annotations can be associated with an entity in memory as an annotation collection. Information (e.g., position or size tolerances) for an entity can be obtained by referencing the annotation collection in memory. The extracted information can include, for example, position and composite position tolerances applied to holes, which may be threaded, countersink, or counterbore holes. This can also include mating hole and pin relationships. This can also include orientation tolerances applied to the tolerances and datum features, which also require virtual condition calculations. In addition, other feature types, such as slots, notches, and widths can be supported.

Prioritize the order in which the annotations are to be paired—The source annotations can be automatically sorted in the order in which they are to be paired, starting with the datums and followed by the position tolerances. This can be accomplished using a "Single Part Verification" method available in software from PrizMetrik, Inc. of Cameron Park, Calif., or similar method, which deduces the manufacturing order of the features in a component based on the applied annotation.

Process each source annotation, starting with datums—The process for each annotation starts with the automatic pairing of the datum features. For each datum in the source annotation, the first step is to search for a mating datum feature on the target. This may begin by comparing the source datum with existing datums on the target. The comparison is done by determining whether two features are considered to be mating (i.e., able to be mated). For each datum feature type (e.g., a plane or hole), it can be determined whether two features are mating based on their geometric makeup and relationships. For example, two planes are considered mating (able to be mated) if they are coincident and have opposing surface normals. Such mating requirements can be eased by, for example, allowing for two planes to have an offset due to a spacer. If a datum for a mating feature in the target is not found, the next step is to search for a mating feature using a "Feature Finder," described below, searching for primary, secondary, or tertiary datum features on the target that mate to the source datum. The process continues if a mating datum is found. If a mating primary, secondary, or tertiary datum is not found on the target, the user can be given a message and allowed to continue or cancel the process.

Find mating tolerance feature—Given the source tolerance feature, a tolerance for a mating feature on the target is automatically determined using the Feature Finder. If the source feature is a pattern (i.e., a set of features of the same type; for example, a set of holes) and the Feature Finder is unsuccessful (as would be the case, for example, when a pattern is created manually), each feature in the source pattern can be attempted to be paired with a feature on the target. If all the features are found, a pattern feature on the target can be created.

Run Auto Dimension Scheme command—An Auto Dimension Scheme command, or similar function, may be run with the datums and the tolerance feature. The function calls a generative tolerance scheme (GTS) command (as described in U.S. Pat. No. 7,590,497 by Tornquist, et al.). An auto dimension scheme command allows a user to specify the datum and tolerance features. The user selections (features) are passed into a GTS engine, which creates the necessary annotation(s) to relate the datums, and the necessary annotation(s) to control the size, orientation, and location of the tolerance features.

Compute the virtual size (VS), a worst-case envelope, of the source features. MMS=Maximum Material Size (e.g., hole of smallest size; stud of largest size).

If the source features are threaded holes or pins:

VS=MMC size+Position Tolerance

If the source features are clearance holes:

VS=MMC size−Position Tolerance

Compute the available tolerance (T) for the target. RFS=Regardless of Feature Size.

If the target features are holes:

$T$=RFS Target−VS Source

If the target features are threaded holes or pins:

$T$=VS Source−RFS Target

An error can be given if T is less than zero, as the target features are not compatible with the source features. For example, if the source features are 10 mm threaded holes and the clearance holes on the target are 9 mm, which would cause an interference condition.

Compute and update the position tolerance (PT) for the target.

If the target features are threaded holes:

PT=$T$

If the target features are clearance holes and the source are threaded holes

PT=Document property value (a default value) if less than $T$, else

PT=0.0

If the target and source features are clearance holes

PT=Source PT if less than $T$, else

PT=Document properties value if less than $T$, else

PT=0

Compute and update the size tolerance (ST) for the target. If the target features are a feature of size:

ST=$T$−PT

The size tolerance is automatically applied as a symmetric tolerance.

Draw annotations—An automatic process to create and layout the dimension and tolerances can be based on a function used by the Auto Dimension Scheme command.

Cleanup—Automatically remove any unused features, such as features created to determine potential matches.

Feature Finder

Feature Finder is an automated process that finds comparable or mating features (e.g., DimXpert features) on a target component given a source component with defined features. The comparison is based on the geometric properties of the faces that makeup the model and does not rely on CAD system modeling features or face IDs. For example, the source component could be modeled using a CAD system, and the target component could be an imported model. When searching for comparable features the two components are essentially the same, and when searching for mating features the two components are mated together in an assembly. As used herein in describing the Feature Finder, the word "feature" can mean a DimXpert feature.

Figure 5:
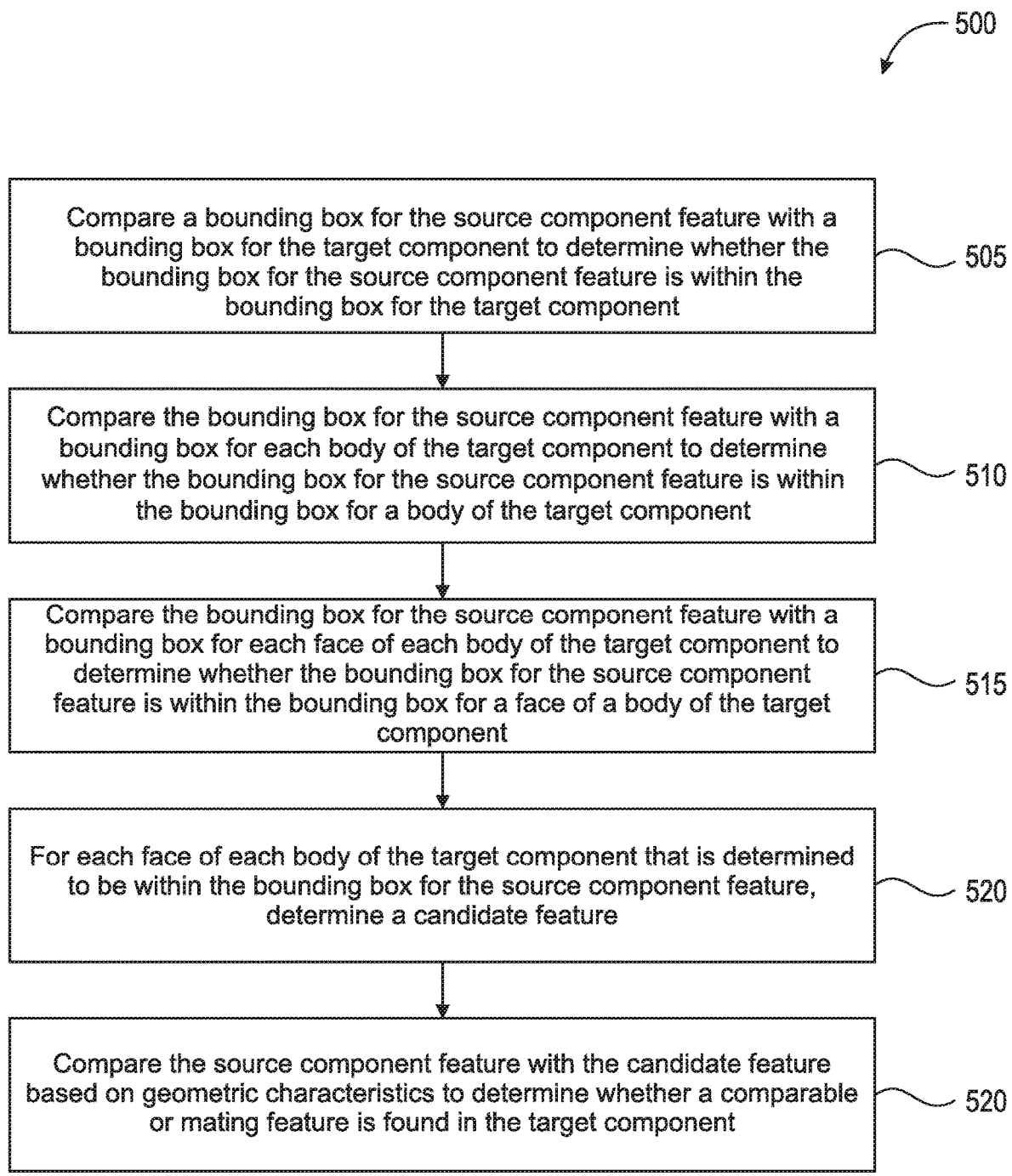
FIG. 5 is a flow diagram illustrating determining, for a source component feature of a CAD model, comparable or mating features on a target component of the CAD model, according to an example embodiment.

FIG. 5 illustrates an example method 500 of determining, for a source component feature of a CAD model, comparable or mating features on a target component of the CAD model, according to an example embodiment. According to the example method 500, a bounding box for the source component feature is compared 505 with a bounding box for the target component to determine whether the bounding box for the source component feature is within the bounding box for the target component. The method 500 continues by comparing 510 the bounding box for the source component feature with a bounding box for each body of the target component to determine whether the bounding box for the source component feature is within the bounding box for a body of the target component. The method 500 continues by comparing 515 the bounding box for the source component with a bounding box for each face of each body of the target component to determine whether the bounding box for the source component feature is within the bounding box for a face of a body of the target component. For each face of each body of the target component that is determined to be within the bounding box for the source component feature, a candidate feature is determined 520 and compared 525 with the source component feature based on geometric characteristics to determine whether a comparable or mating feature is found in the target component.

The following describes in detail an example Feature Finder process as implemented using a SOLIDWORKS® CAD system.

Select source and target components—The process beings by selecting source and target components.

Configure options—A set of options may define search parameters (e.g., allowable distance from source to target feature) and allowable deviations when comparing the source and target features. The options can be hard-coded (not exposed to the user) or user-specified.

Compute a bounding box for the source feature—A bounding box is automatically created that contains the faces of the feature. If the feature has multiple faces, a bounding box can be created for each face and added together to create one composite bounding box. In the SOLIDWORKS® CAD system, for example, the Bounding Box is an existing class (mgBBox_c) that defines a cuboid or spherical volume at a given location. If the feature is a pattern, a bounding box can be created for the seed feature of the pattern. A seed feature is a feature used to define a pattern feature (e.g., DimXpert pattern feature). For example, if a user creates a hole, and then uses the hole to define a circular pattern, then the resultant feature created from the hole is stored as a seed feature for the pattern.

Determine target components—Automatically determine the components (moComponent_c) for the part or assembly. For a part there is a single component. For an assembly there can be one or more components.

Compare the bounding boxes of the source feature with each target component—A bounding box is automatically created for the target component, which may then be scaled-up by a system-defined or user-specified factor. The two bounding boxes are compared, and the comparison is successful if the source feature bounding box is contained within the target component bounding box, or if the two boxes intersect when searching for mating features.

Compare the bounding boxes of the source feature with each body of the target component—A bounding box is automatically created for each body in the target component, which may then be scaled-up by the system-defined or user-specified factor. The bounding boxes of the source feature and each body of the target component are compared, and the comparison is successful if the source feature bounding box is contained within the respective body bounding box, or if the two bounding boxes intersect when searching for mating features.

Compare the bounding boxes of the source feature and each face of each body of the target component—The source feature bounding box may be scaled-up by the system-defined or user-specified factor. For each face of each body of the target component, a new bounding box is created and compared to the expanded source feature bounding box. This comparison succeeds if the bounding box of the face is contained within the source bounding box, or if there is an intersection with the source bounding box when searching for mating features.

Use CAD system Feature Recognition (FR) library to find candidate target features—For each face that passes the above comparisons, the feature recognition library can be used to find a candidate feature. For example, if a given body of the target components passes a comparison, then all faces of the given body are analyzed for candidate features. For each face, a new bounding box can automatically be created. If the new bounding box is contained within or intersects with the source feature bounding box, the face can be passed into feature recognition. When searching for a comparable feature, FR options can be configured to look only for the source feature type, and when looking for mating features, the FR options can be configured to look for all possible mating feature types. For example, a boss feature can mate with a hole, counterbore hole, or countersink hole.

Compare the source feature with the candidate feature— When searching for comparable features, the two features can be compared based on their geometric characteristics. A set of options can be used to determine what is considered equal, and can be configured for a strict or relaxed comparison. When automatically searching for mating features, the two features can be compared based on their type and interrelationship. For example, two planes can be opposed or be neighbors. A pin and a hole would likely have coincident axes, and the pin diameter would be less than the hole to ensure that the pin can be inserted into the hole. A set of options can be configured to define what relationships between features are considered to be mating, and can be configured for a strict or relaxed comparison. A comparable or mating feature is found when all the steps succeed.

Figure 6:
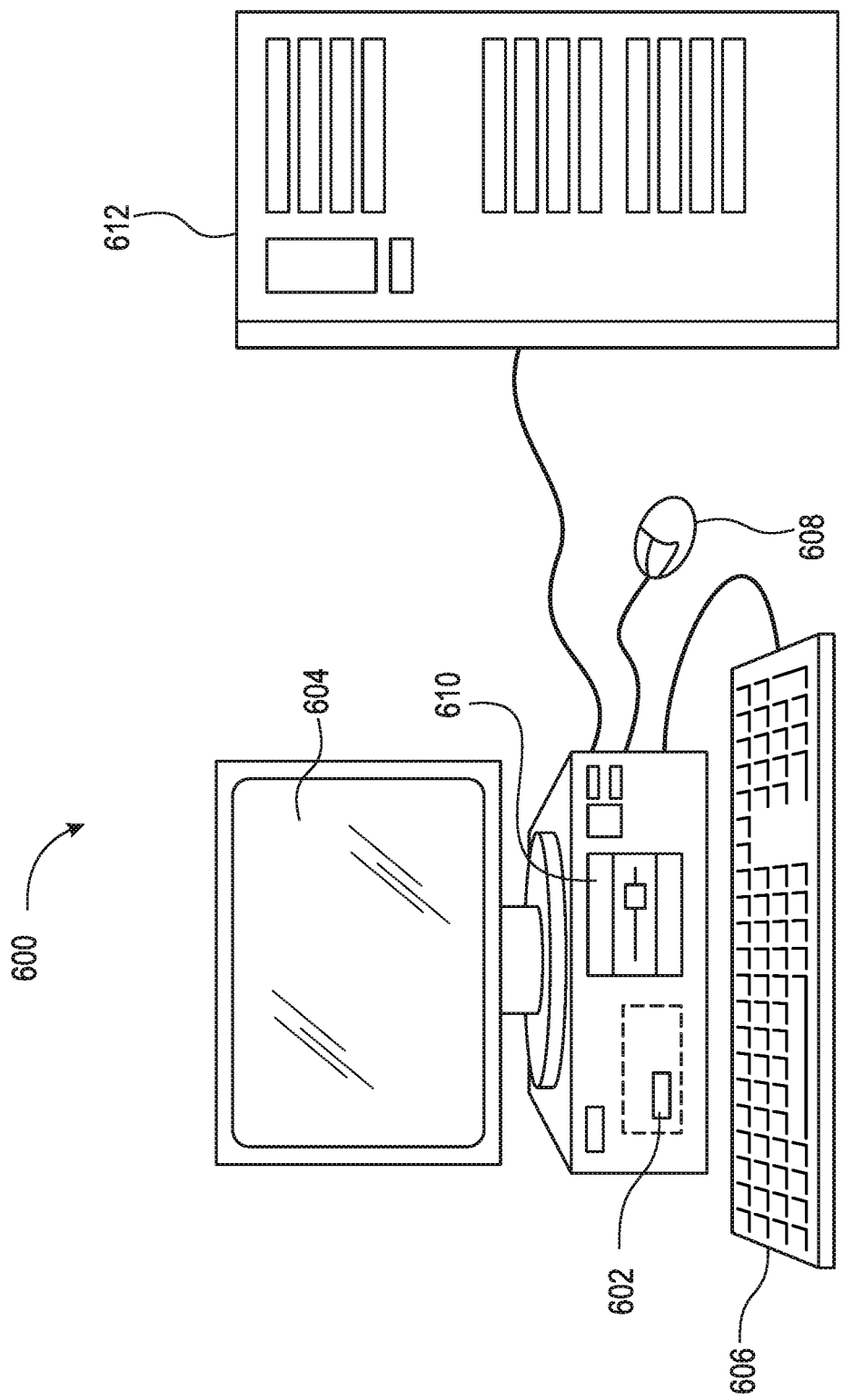
FIG. 6 is a schematic diagram of a computer system in which embodiments may be implemented.

FIG. 6 illustrates a computerized modeling system 600 that includes a CPU 602, a computer monitor 604, a keyboard input device 606, a mouse input device 608, and a storage device 610. The CPU 602, computer monitor 604, keyboard 606, mouse 608, and storage device 610 can include commonly available computer hardware devices. For example, the CPU 602 can include an Intel-based processor. The mouse 608 may have conventional left and right buttons that the design engineer may press to issue a command to a software program being executed by the CPU 602. As an alternative or in addition to the mouse 608, the computerized modeling system 600 can include a pointing device such as a trackball, touch-sensitive pad, or pointing device and buttons built into the keyboard 606. Those of ordinary skill in the art appreciate that the same results described herein with reference to a mouse device can be achieved using another available pointing device. Other appropriate computer hardware platforms are suitable as will become apparent from the discussion that follows. Such computer hardware platforms are preferably capable of operating the Microsoft Windows NT, Windows 2000, Windows XP, Windows ME, Windows 7 et seq., UNIX, Linux, or MAC OS operating systems.

Additional computer processing units and hardware devices (e.g., rapid prototyping, video, and printer devices) may be included in the computerized modeling system 600. Furthermore, the computerized modeling system 600 may include network hardware and software, thereby enabling communication to a hardware platform 612, and facilitating communication between numerous computer systems that include a CPU and a storage system, among other computer components.

Computer-aided modeling software (e.g., process 400 and 500) may be stored on the storage device 610 and loaded into and executed by the CPU 602. The modeling software allows a design engineer to create and modify a 3D model and implements aspects of the embodiments described herein. The CPU 602 uses the computer monitor 604 to display a 3D model and other aspects thereof as described. Using the keyboard 606 and the mouse 608, the design engineer can enter and modify data associated with the 3D model. The CPU 602 accepts and processes input from the keyboard 606 and mouse 608. The CPU 602 processes the input along with the data associated with the 3D model and makes corresponding and appropriate changes to that which is displayed on the computer monitor 604 as commanded by the modeling software. In one embodiment, the modeling software is based on a solid modeling system that may be used to construct a 3D model consisting of one or more solid and surface bodies.

Embodiments may be implemented in digital electronic circuitry, or in computer hardware, firmware, software, or in combinations thereof. Apparatuses may be implemented in a computer program product tangibly embodied in a machine-readable storage device for execution by a programmable processor; and method steps may be performed by a programmable processor executing a program of instructions to perform functions by operating on input data and generating output. Embodiments may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; in any case, the language may be a compiled or interpreted language. Suitable processors include, by way of non-limiting example, both general and special purpose microprocessors. Generally, a processor receives instructions and data from a read-only memory and/or a random access memory and in some embodiments instructions and data may be downloaded through a global network. Storage devices suitable for tangibly embodying computer program instructions and data include all forms of non-volatile memory, including by way of example semiconductor memory devices, such as EPROM, EEPROM, and flash memory devices; magnetic disks, such as internal hard disks and removable disks; magneto-optical disks; and CD-ROM disks. Any of the foregoing may be supplemented by, or incorporated in, custom-designed ASICs (application-specific integrated circuits).

An advantage of the embodiments disclosed herein is alleviation of issues that occur when the tolerances applied to components are computed incorrectly in prior methods and systems. Such issues can lead, downstream, to parts that are manufactured per dimensional requirements, but do not assemble due to interferences, which leads to costly rework scenarios or scrapped parts. Not only is the calculation of each tolerance done automatically, but the necessary dimensions, tolerances, and display items are automatically generated. Another advantage of the disclosed embodiments is the systematic deduction of necessary datum features of a target component given datums defined on a source component. This is advantageous because the correct application of datums is one of the biggest challenges when applying geometric dimensions and tolerances. The disclosed embodiments solve this challenge.

While example embodiments have been particularly shown and described, it will be understood by those skilled in the art that various changes in form and details may be made therein without departing from the scope of the embodiments encompassed by the appended claims. For example, implementations may change the order in which operations are performed. Further, depending on the needs of an implementation, particular operations described herein may be implemented as a combined operation, eliminated, added to, or otherwise rearranged. Further, particular user interface operations relative to a mouse (e.g., click, drag, drop, etc.) are by way of illustration and not limitation. Other user interface operations for selecting, moving, placing, etc., model or design data are suitable.

What is claimed is:

1. A computer-implemented method of automatically generating dimension and tolerance information for a target component, given a source component, in a subject computer-aided design (CAD) model of a real-world object, the method comprising:
in a digital processor, performing, by the processor, the steps of:
determining a source feature from the source component to be mated with the target component;
determining a mating feature on the target component by searching for existing datums of the target component, wherein no existing datums of the target component are found by the searching;
continuing to determine the mating feature on the target component by determining comparable or mating features on the target component based on geometric properties of faces of the target component by automatically generating and comparing a bounding box for the determined source feature with bounding boxes for faces of bodies of the target component;
determining a tolerance for the mating feature by determining comparable or mating features on the target component based on a tolerance of the determined source feature and geometric properties of faces of the target component;
computing a virtual size of the determined source feature based on a maximum material size of the determined source feature and a position tolerance of the determined source feature;
computing an available tolerance for the target component based on a size of the target component and the virtual size of the determined source feature;
computing a position tolerance for the target component based on the available tolerance for the target component;
computing a size tolerance for the target component based on the available tolerance and the position tolerance for the target component; and
automatically applying the computed position tolerance and the computed size tolerance to the target component in the subject CAD model of the real-world object, the model employing the computed position tolerance and the computed size tolerance in a simulation of a mating of the source component with the target component.

2. A computer-implemented method as in claim 1 wherein determining a source feature from the source component to be mated with the target component includes determining a feature for a hole.

3. A computer-implemented method as in claim 1 wherein determining a source feature from the source component to be mated with the target component includes determining a feature to mate a hole and a pin.

4. A computer-implemented method as in claim 1 wherein determining a source feature from the source component to be mated with the target component includes determining a feature for an orientation tolerance.

5. A computer-implemented method as in claim 1 further comprising determining an order, from among a plurality of source features, in which the determined source feature is to be mated with the target component.

6. A computer-implemented method as in claim 1 wherein determining comparable or mating features on the target component based on geometric properties of faces of the target component by automatically generating and comparing a bounding box for the determined source feature with bounding boxes for faces of bodies of the target component includes:
  comparing a bounding box for the determined source feature with a bounding box for the target component to determine whether the bounding box for the determined source feature is within the bounding box for the target component;
  comparing the bounding box for the determined source feature with a bounding box for each body of the target component to determine whether the bounding box for the determined source feature is within the bounding box for a body of the target component;
  comparing the bounding box for the determined source feature with a bounding box for each face of each body of the target component to determine whether the bounding box for the determined source feature is within the bounding box for a face of a body of the target component;
  for each face of each body of the target component that is determined to be within the bounding box for the determined source feature, determining a candidate feature; and
  comparing the determined source feature with the candidate feature based on geometric characteristics to determine whether a comparable or mating feature is found in the target component.

7. A computer-aided design (CAD) system comprising:
  a computer database configured to store information regarding source and target components of a subject CAD model representing a real-world object; and
  a processor operatively coupled to the computer database and configured to:
    determine a source feature from the source component to be mated with the target component;
    determine a mating feature on the target component by searching for existing datums of the target component, wherein no existing datums of the target component are found by the searching;
    continue to determine the mating feature on the target component by determining comparable or mating features on the target component based on geometric properties of faces of the target component by automatically generating and comparing a bounding box for the determined source feature with bounding boxes for faces of bodies of the target component;
    determine a tolerance for the mating feature by determining comparable or mating features on the target component based on a tolerance of the determined source feature and geometric properties of faces of the target component;
    compute a virtual size of the determined source feature based on a maximum material size of the determined source feature and a position tolerance of the determined source feature;
    compute an available tolerance for the target component based on a size of the target component and the virtual size of the determined source feature;
    compute a position tolerance for the target component based on the available tolerance for the target component;
    compute a size tolerance for the target component based on the available tolerance and the position tolerance for the target component; and
  automatically apply the computed position tolerance and the computed size tolerance to the target component in the subject CAD model of the real-world object, the model employing the computed position tolerance and the computed size tolerance in a simulation of a mating of the source component with the target component.

8. A CAD system as in claim 7 wherein the processor determines a feature for a hole as the source feature from the source component to be mated with the target component.

9. A CAD system as in claim 7 wherein the processor determines a feature to mate a hole and a pin as the source feature from the source component to be mated with the target component.

10. A CAD system as in claim 7 wherein the processor determines a feature for an orientation tolerance as the source feature from the source component to be mated with the target component.

11. A CAD system as in claim 7 wherein the processor is further configured to determine an order, from among a plurality of source features, in which the determined source feature is to be mated with the target component.

12. A CAD system as in claim 7 wherein the processor is configured to automatically generate and compare a bounding box for the determined source feature with bounding boxes for faces of bodies of the target component by:
  comparing a bounding box for the determined source feature with a bounding box for the target component to determine whether the bounding box for the determined source feature is within the bounding box for the target component;
  comparing the bounding box for the determined source feature with a bounding box for each body of the target component to determine whether the bounding box for the determined source feature is within the bounding box for a body of the target component;
  comparing the bounding box for the determined source feature with a bounding box for each face of each body of the target component to determine whether the bounding box for the determined source feature is within the bounding box for a face of a body of the target component;
  for each face of each body of the target component that is determined to be within the bounding box for the determined source feature, determining a candidate feature; and
  comparing the determined source feature with the candidate feature based on geometric characteristics to determine whether a comparable or mating feature is found in the target component.

13. A non-transitory computer-readable data storage medium having computer-readable program codes embodied therein for automatically generating dimension and tolerance information for a target component, given a source component, in a subject computer-aided design (CAD) model of a real-world object, the computer-readable data storage medium program codes including instructions that, when executed by a processor, cause the processor to:
  determine a source feature from the source component to be mated with the target component;
  determine a mating feature on the target component by searching for existing datums of the target component, wherein no existing datums of the target component are found by the searching;
  continue to determine the mating feature on the target component by determining comparable or mating features on the target component based on geometric properties of faces of the target component by automatically generating and comparing a bounding box for the determined source feature with bounding boxes for faces of bodies of the target component;

determine a tolerance for the mating feature by determining comparable or mating features on the target component based on a tolerance of the determined source feature and geometric properties of faces of the target component;

compute a virtual size of the determined source feature based on a maximum material size of the determined source feature and a position tolerance of the determined source feature;

compute an available tolerance for the target component based on a size of the target component and the virtual size of the determined source feature;

compute a position tolerance for the target component based on the available tolerance for the target component;

compute a size tolerance for the target component based on the available tolerance and the position tolerance for the target component; and automatically apply the computed position tolerance and the computed size tolerance to the target component in the subject CAD model of the real-world object, the model employing the computed position tolerance and the computed size tolerance in a simulation of a mating of the source component with the target component.

14. A non-transitory computer-readable data storage medium as in claim 13 wherein the instructions cause the processor to determine a feature for a hole as the source feature from the source component to be mated with the target component.

15. A non-transitory computer-readable data storage medium as in claim 13 wherein the instructions cause the processor to determine a feature to mate a hole and a pin as the source feature from the source component to be mated with the target component.

16. A non-transitory computer-readable data storage medium as in claim 13 wherein the instructions cause the processor to determine a feature for an orientation tolerance as the source feature from the source component to be mated with the target component.

17. A non-transitory computer-readable data storage medium as in claim 13 wherein the instructions cause the processor to determine an order, from among a plurality of source features, in which the determined source feature is to be mated with the target component.

18. A non-transitory computer-readable data storage medium as in claim 13 wherein the instructions cause the processor to automatically generate and compare a bounding box for the determined source feature with bounding boxes for faces of bodies of the target component by:

comparing a bounding box for the determined source feature with a bounding box for the target component to determine whether the bounding box for the determined source feature is within the bounding box for the target component;

comparing the bounding box for the determined source feature with a bounding box for each body of the target component to determine whether the bounding box for the determined source feature is within the bounding box for a body of the target component;

comparing the bounding box for the determined source feature with a bounding box for each face of each body of the target component to determine whether the bounding box for the determined source feature is within the bounding box for a face of a body of the target component;

for each face of each body of the target component that is determined to be within the bounding box for the determined source feature, determining a candidate feature; and comparing the determined source feature with the candidate feature based on geometric characteristics to determine whether a comparable or mating feature is found in the target component.

19. A computer-implemented method of automatically determining, for a source component feature of a CAD model of a real-world object, comparable or mating features on a target component of the CAD model, the method comprising:

comparing a bounding box for the source component feature with a bounding box for the target component to determine whether the bounding box for the source component feature is within the bounding box for the target component;

comparing the bounding box for the source component feature with a bounding box for each body of the target component to determine whether the bounding box for the source component feature is within the bounding box for a body of the target component;

comparing the bounding box for the source component feature with a bounding box for each face of each body of the target component to determine whether the bounding box for the source component feature is within the bounding box for a face of a body of the target component;

for each face of each body of the target component that is determined to be within the bounding box for the source component feature, determining a candidate feature;

comparing the source component feature with the candidate feature based on geometric characteristics to determine whether a comparable or mating feature is found in the target component; and automatically applying datums regarding the determined comparable or mating feature of the target component to the target component in the CAD model of the real-world object, the model employing the determined comparable or mating feature in a simulation of a mating of the source component feature with one or more features on the target component, wherein each of the comparing, determining, and automatically applying is performed by a computer processor.

20. A method as in claim 19 further including determining the bounding box for the source component feature by creating a bounding box for each face of the source component feature and combining the bounding boxes together to create one bounding box for the source component feature.

* * * * *